United States Patent
Ondar

(10) Patent No.: US 11,666,138 B2
(45) Date of Patent: Jun. 6, 2023

(54) ELECTRIC TOOTHBRUSH

(71) Applicant: Orlan Dulushovich Ondar, Kyzyl (RU)

(72) Inventor: Orlan Dulushovich Ondar, Kyzyl (RU)

( * ) Notice: Subject to any disclaimer, the term of this patent is extended or adjusted under 35 U.S.C. 154(b) by 254 days.

(21) Appl. No.: 17/030,526

(22) Filed: Sep. 24, 2020

(65) Prior Publication Data

US 2021/0282544 A1     Sep. 16, 2021

(30) Foreign Application Priority Data

Mar. 13, 2020   (RU) .......................... RU2020110662

(51) Int. Cl.

| | |
|---|---|
| *A46B 13/04* | (2006.01) |
| *A46B 5/00* | (2006.01) |
| *A46B 9/04* | (2006.01) |
| *A46B 11/00* | (2006.01) |
| *A46B 13/02* | (2006.01) |
| *A46B 17/04* | (2006.01) |
| *A61C 17/22* | (2006.01) |

(52) U.S. Cl.
CPC ............ *A46B 13/04* (2013.01); *A46B 5/0095* (2013.01); *A46B 9/04* (2013.01); *A46B 11/0062* (2013.01); *A46B 13/023* (2013.01); *A46B 17/04* (2013.01); *A61C 17/227* (2013.01)

(58) Field of Classification Search
CPC ... A46B 13/04; A46B 5/0095; A46B 11/0062; A46B 11/00; A46B 13/023; A46B 17/04
See application file for complete search history.

(56) References Cited

U.S. PATENT DOCUMENTS

| | | | | |
|---|---|---|---|---|
| 2,505,547 A | * | 4/1950 | Howard ............. | A46B 11/0006 401/280 |
| 3,734,118 A | * | 5/1973 | Howard ............. | A46B 11/0006 401/125 |
| 3,937,235 A | | 2/1976 | Broughton | |
| 4,467,822 A | * | 8/1984 | Blackwell ............ | A46B 5/0041 401/175 |

FOREIGN PATENT DOCUMENTS

| | | | |
|---|---|---|---|
| CN | 103431627 A | * | 12/2013 |
| CN | 104023148 A | * | 9/2014 |
| RU | 2003127365 A | | 3/2005 |
| RU | 159434 U1 | | 2/2016 |
| RU | 180620 U1 | | 6/2018 |

* cited by examiner

*Primary Examiner* — Shay Karls
(74) *Attorney, Agent, or Firm* — Muncy, Geissler, Olds & Lowe, P.C.

(57) ABSTRACT

An electric toothbrush relates to personal care products, oral care products, namely, toothbrushes. The technical result is achieved due to the fact that the electric toothbrush consists of a bottle body containing the cleaning agent, a neck with a bristle attachment, a push dispenser for feeding the cleaning agent, while the bottle body and the neck with the bristle attachment are connected by a fixing device and move in the longitudinal plane relative to each other, wherein the neck housing comprises an insert-type electric actuator tightly fixed therein, a compartment for at least one battery, an insulating cover of the compartment, and a button for activating the toothbrush, wherein the bristle attachment performs a vibration movement, and wherein the spout of the head of the push dispenser does not come into contact with the bristle attachment when in the folded position.

11 Claims, 4 Drawing Sheets

ELECTRIC TOOTHBRUSH

FIELD OF THE INVENTION

The present invention relates to personal care products, oral care products, namely, toothbrushes. It can be manufactured by consumer goods industry enterprises.

STATE OF ART

A technical solution disclosed in the utility model patent U.S. Pat. No. 3,937,235A (IPC: A46B11/0017, publication/priority date: 05.12.1974) is known: Toothbrush with paste cartridge.

The disadvantage of this patent is that feeding of cleaning agent from the brush handle is done through the feed channels directly to the bristles, which creates the risk of entering the contaminants into the container with cleaning agent. In addition, there is a risk of inadvertent feeding of the cleaning agent, since this process is driven by the movement of the brush relative to the handle.

A system for feeding a fluid for oral care is also known from a technical solution presented in the text of the utility model patent No. 159434 (IPC: A46B 11/00, publication date: Feb. 10, 2016).

However, this technical solution provides feeding of cleaning agent through the feed channels directly to the bristles of the brush, creating a risk of entering the contaminants into the container with cleaning agent. Also, a disadvantage of this technical solution is that it is necessary to separate the container with the cleaning agent from the whole housing of the toothbrush for "filling" it.

A technical solution No. 180620 (IPC: A46B 9/04, date of publication: Jun. 19, 2018) is also known. This patent has the disadvantage that the feeding is done directly through the feed channels to the bristles of the toothbrush.

The closest analogue is patent of invention No. 2255707 "Device for cleaning teeth" (IPC: A61 C17/22, publication date: Mar. 20, 2005). It is the handle of an electric device for cleaning teeth, which handle comprises a connecting portion for connecting a cleaning tool, in particular a removable brush, a drive for driving the connected cleaning tool, and also a control device for controlling the drive, wherein the control device has an operation interlock device and a coding check device for recognizing the code of a disconnecting device for the connected cleaning tool, wherein the interlock device is configured for being disconnected by the disconnecting device provided in particular on the cleaning tool, depending on the signal from the coding check device.

The disadvantage of this technical solution is the lack of the possibility of feeding of the cleaning agent through the housing and the lack of the portable movement due to toothbrush folding.

ESSENCE OF THE INVENTION

Figure 1:
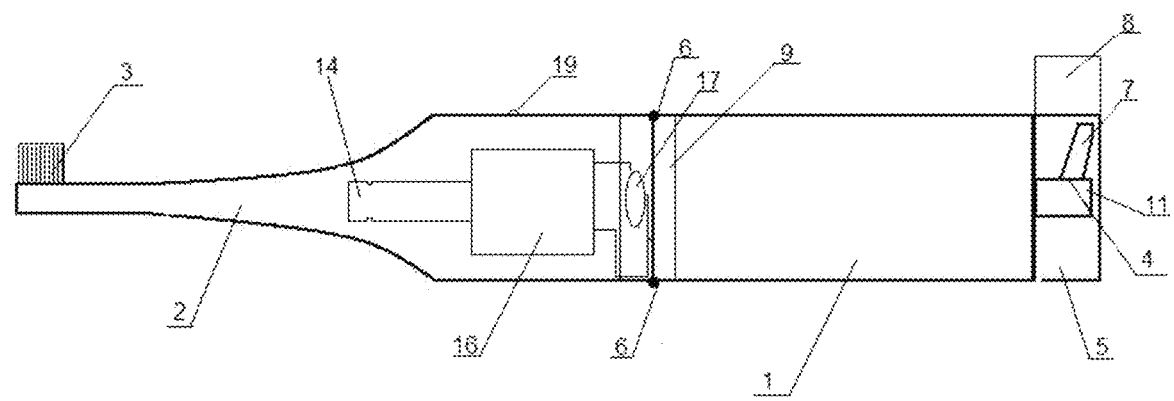
FIG. 1 is a general view of an electric toothbrush.
Figure 2:
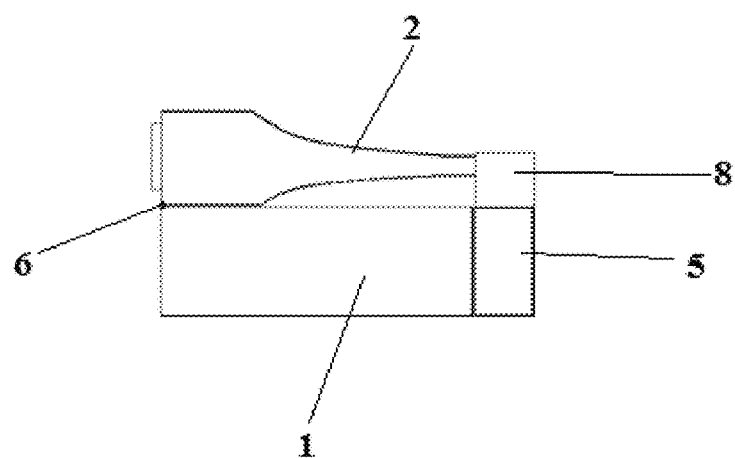
FIG. 2 is an external view of the electric toothbrush in a folded position with a cap.
Figure 3:
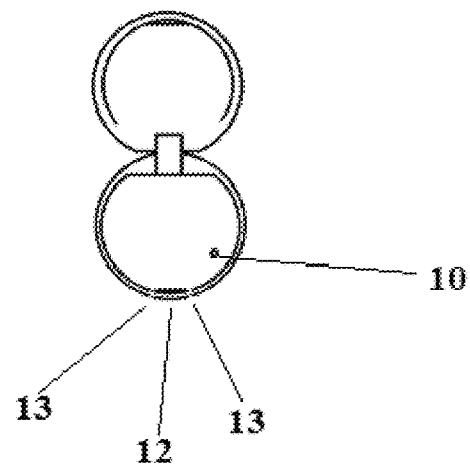
FIG. 3 is toothbrush lock-on connection.
Figure 4:
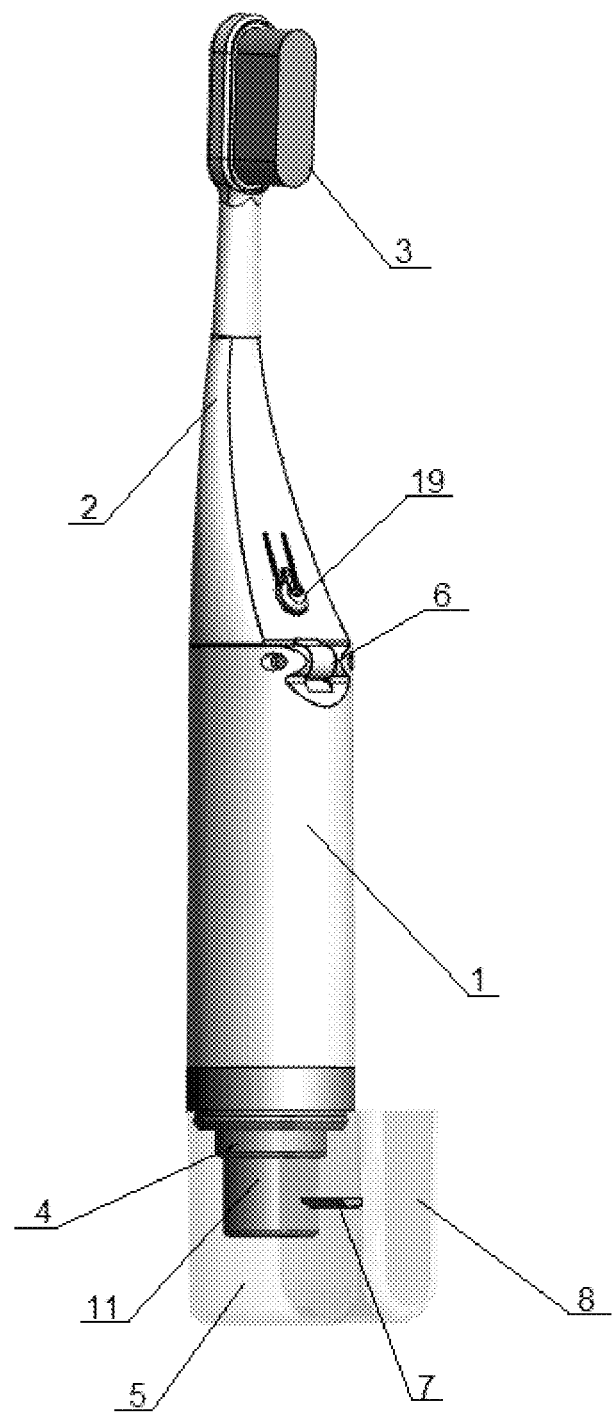
FIG. 4 is the electric toothbrush, a general view of the product.
Figure 5:
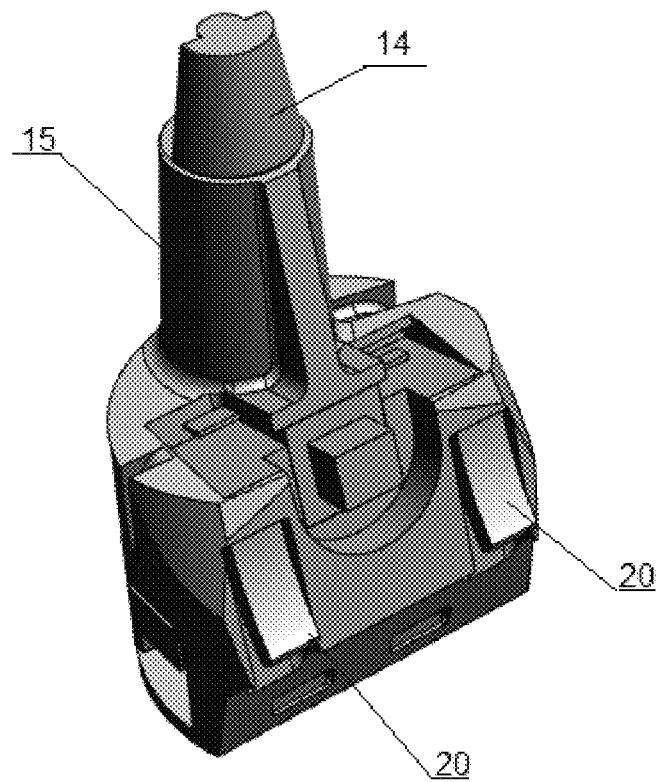
FIG. 5 is a top view of an electric actuator.
Figure 5A:
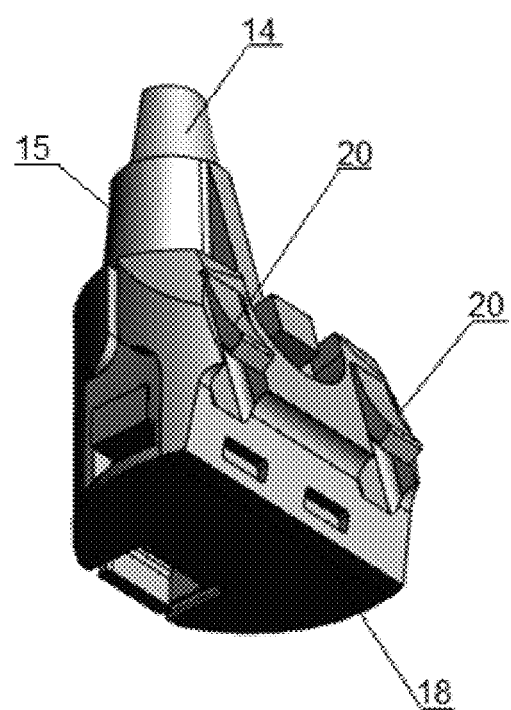
FIG. 5a is a bottom view of the electric actuator.
Figure 6:
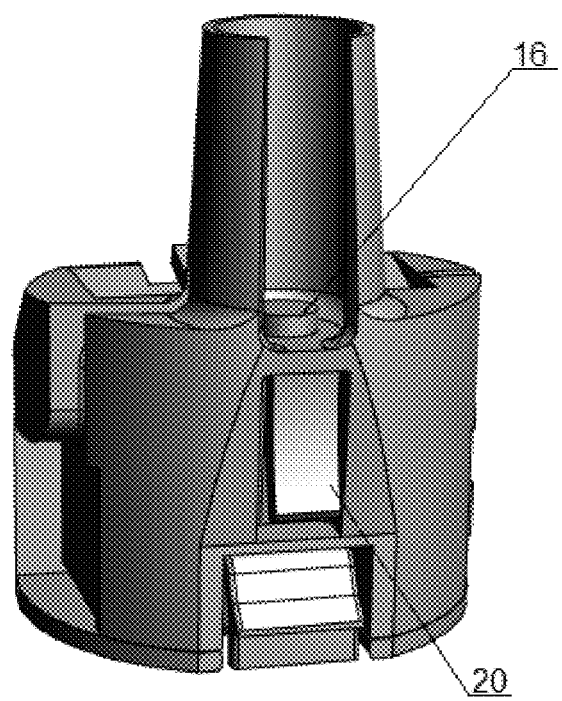
FIG. 6 is the electric actuator with the motor.
These drawings are illustrated by the following positions: 1—bottle body, 2—neck, 3—bristle attachment, 4—push dispenser, 5—protective cap, 6—fixing device, 7—spout of the head, 8—cap pocket, 9—piston, 10—hole for air intake, 11—push button of the dispenser, 12—groove at the base of the neck, 13—projections, 14—output shaft, 15—motor, 16—electronic converter, 17—battery compartment, 18—insulating cover of the compartment, 19—an activation button, 20—lock on the electric actuator housing.

The technical problem to be solved by this technical solution is the lack of functional portable electric toothbrushes that are easy to transport, comprising combination of bristles for cleaning and a cleaning agent, without which it is impossible to achieve the result when using thereof. Also, similar toothbrushes that are currently on the market do not provide adequate hygiene, namely, the cleaning agent is discharged from the bore directly through the bristles, which results in the ingress of catalase, bacteria into the internal container containing the cleaning agent.

This technical problem is solved by achieving such a technical result as improving the quality of brushing teeth, by ensuring the hygiene of the portable electric toothbrush combining bristles for cleaning and the cleaning agent.

The technical result is achieved due to the fact that the electric toothbrush comprises of a bottle body containing a cleaning agent, a neck with a bristle attachment, a push dispenser for the cleaning agent feeding, wherein there is a piston at the bottom of the bottle body that prevents the cleaning agent from flowing/spilling out of the bottle body through the air hole at the bottom of the bottle body, when the bottle body and the neck with the bristle attachment are connected by a fixing device and move in the longitudinal plane relative to each other, wherein the neck comprises an insert-type electric actuator tightly fixed therein, a compartment for at least one battery, an insulating cover of the compartment, and a button for activating the toothbrush, wherein the bristle attachment performs vibration movement, and wherein the spout of the head of the push dispenser does not come into contact with the bristle attachment when the toothbrush is in the folded position, while a push button of the dispenser in the form of a cylinder with a base circle radius of 70 mm to 1 cm and a height of 1 cm to 1.5 cm.

The bottle body of the toothbrush contains the cleaning agent, which may be in the form of a friable substance, a viscous substance, a toothpaste in the liquid state or a tooth foam. According to the present technical solution, the concept of "bottle body" is understood to mean any housing having an internal cavity for a substance. It performs a protective function and is the shape-generating element of the toothbrush handle.

The push dispenser (4) is used to feed the cleaning agent from the bottle body to the bristle attachment of the toothbrush neck (2). When pressing the push button of the dispenser, the inner part of the push button creates pressure on the container of the bottle body (1), namely, on the compression chamber with the cleaning agent, by closing the bottom valve or hinge separating the deformable compression chamber from the main container of the bottle body, thereby preventing back extrusion of the cleaning agent into the main container of the bottle body through the feeding tube. The cleaning agent, due to the formed pressure, flows through the spout of the head (7) of the push dispenser onto the bristle attachment (3) of the toothbrush. After stopping the pressure on the push button (11) of the dispenser, the push button, due to the spring or the created vacuum, which is created by the air coming from the hole (10), returns to its original position in the process of equalizing the pressure, thereby creating the effect of pressure compensation in the compression chamber. A valve or hinge located in the upper part of the tapering end of the compression chamber of the push dispenser clogs the outlet channel, and a valve or hinge located in the lower part of the compression chamber opens or frees up the passage of the feeding tube, and the cleaning agent from the main container of the bottle body enters into the compression chamber through the feeding tube. The compression chamber is filled with the cleaning agent, the push button of the push dispenser returns to its original position, and the pullback spring also takes up its original undeformed position.

The push button can be made in the form of a cylinder made of a rigid material, for example, a plastic polymer or metal, and the width and/or length of the cylinder can vary depending on the parameters of the opening for the push button in the bottle body. Also, the push button can have the shape of a semicircle. However, in the claimed technical device, the spout of the push dispenser head and the push button are parts of the push dispenser, therefore, the size of the spout depends on the parameters of the push button. As a result, the convenience of pressing the push button of the dispenser and the volume of the cleaning agent fed for one full press of the push button of the dispenser are of fundamental importance to us. The most convenient is the push button of the dispenser in the form of a cylinder with a base circle radius of 70 mm to 1 cm and a height of 1 cm to 1.5 cm.

Also, this technical solution provides a replaceable toothbrush bristle attachment (3). In one of the options, the replaceable toothbrush bristle attachment can be made with projections on its lower part, and the neck of the toothbrush (2) can have corresponding grooves, designed in such a way that when the projections of the replaceable toothbrush bristle attachment enter the grooves of the toothbrush neck, fixation of the replaceable toothbrush bristle attachment is achieved, which prevents the replaceable toothbrush bristle attachment from falling out of the toothbrush neck. To use the invention in order to achieve the technical result and solve the technical problem, it is necessary to use the bristle attachment and the neck of the bottle body as a single unit.

The electric toothbrush has a protective cap (5) that fits over the bristle attachment and the push dispenser (4) and prevents contaminants from entering the replaceable toothbrush bristle attachment, which results in increasing the overall lifetime of single replaceable bristle. The protective cap is one-piece and is put on simultaneously on the bristle attachment and on the push dispenser, which reduces the risk of losing the protective cap. The protective cap also functions as a support for the toothbrush when in the open position, due to the fact that the protective cap has a larger base area in comparison with the base of the push dispenser, which cap is the footing of the toothbrush when in the open position, which in turn ensures the stability of the toothbrush in the upright position. The protective cap itself consists of a cap that protects the push dispenser and a pocket (8) that protects the bristle attachment (3).

It should also be noted that there is no direct contact between the spout of the head of the push dispenser and the bristle attachment when in the folded position; as a result, there is no possibility of catalase ingress onto the surface of the outlet opening, which results in no favorable environment for the bacterial microflora development, the organisms of which could later get onto the bristles together with cleaning agent.

The bottle body and the neck of the toothbrush are connected by the fixing device (6), which allows the invention to realize moving the bottle body and the neck with the bristle attachment in the longitudinal plane of the brush, relative to each other in such a manner that bristles are opposite the push dispenser spout of the head opening when the neck is folded.

The fixing device can in particular be made in the form of a metal fastener having the form of a loop arrow or a surface hinge. These mounts can be made of a different material that allows the mount to withstand the bending load when folding the toothbrush up. However, the most practical is to use a loop arrow in the toothbrush, since its design is more mobile due to one tapered end attached to the neck of the toothbrush. The second end of the loop-arrow is made in the form of a hollow tube, both edges of which fall into the corresponding cylindrical grooves located on the circumference of the upper part of the bottle body. Moreover, the distance between the base of the loop arrow and the grooves is less than the length of a cylinder groove, and therefore the loop arrow tube does not fall out of the grooves. The electric toothbrush is fixed when it is expanded 180 degrees from the folded position, wherein the toothbrush neck and the bottle body are fixed in the same plane by lock-on connection, which is provided by the presence of a groove (12) at the base of the toothbrush neck, while the projection located at the base of the bottle body enters therein. In one of the embodiments, a more effective fixation is achieved due to the presence of two cuts located vertically on the sides of the projection (13), which cuts end at the base of the bottle body. A click may be a signal of a firm connection of two fasteners.

At the bottom of the bottle body, there is also a piston (9), which is a protective plate that prevents the cleaning agent from flowing/spilling out of the bottle body container through the air hole (10). The piston is made of a material identical to the material of the bottle body of the toothbrush, namely, plastic polymer. The piston is made in the form of a circle so that the proportion and shape of the total area of the piston circumference and the bottom of the bottle body provides their full contact with no space between the inner wall of the bottle body and the edges of the piston circumference.

The electric toothbrush also has an electric actuator, which comprises an output shaft (14), motor (15), and an electronic converter (16). The electric actuator is located in the neck housing, which makes it possible to fold the toothbrush into an inoperative position without damaging the system of the electric actuator.

The electric actuator is insert-type. For tight fixation of the electric actuator in the neck housing, it is necessary to place it into the neck housing until three locks (20) located on the electric actuator body are locked in with the corresponding three holes on the neck housing, which holes provide tight fastening the actuator in the neck housing. Thus, when the electric actuator is activated, the vibration emanating from the electric toothbrush housing and bristles of the bristle attachment will not contribute to unbalancing the electric actuator or falling out of the operating position, with the possibility of closing the electric circuit for the operation of the invention.

The electric toothbrush provides the compartment for at least one battery (17) and the insulating cover of the compartment (18), which are also located on the neck of the brush. At the same time, the insulating cover of the compartment isolates the battery from moisture penetration due to a snug fit to the neck housing at the site of the battery compartment.

To activate the device, the activation button (19) is provided, which is also located on the neck of the electric toothbrush. When it is pressed, the electronic circuit is closed. After that, the motor and the output shaft are set in motion, providing vibration movement of the bristle attachment.

The bottle body and the neck housing can be made of a biodegradable polymer, which is degradable over time, in order to prevent environmental pollution, while the protection of environment still remains actual. The decomposition of the housing occurs as a result of natural chemical processes.

In addition, it is clear from the foregoing disclosure that the invention is not limited to the foregoing embodiment. Numerous possible modifications, changes, variations and substitutions within the spirit and scope of the invention will be apparent to those skilled in the relevant art.

For toothbrush use, the protective cap is removed from the bristle attachment and the push dispenser, the button of the push dispenser is pressed, and the cleaning agent is squeezed onto the bristle attachment of the toothbrush. Then, the last is "opened" in such a way that the neck of the toothbrush is fixed in the grooves of the bottle body. The protective cap is put on the lower part of the bottle body, thereby protecting the push dispenser from the ingress of contaminants. Then, the activation button is pressed, the electric toothbrush vibrates. Due to vibration, the quality of brushing the teeth and the oral cavity is improved, which contributes to the achievement of the technical result, namely, the improvement of the quality of brushing the teeth, due to the hygiene of the portable electric toothbrush, which couples bristles for cleaning with the cleaning agent.

For "filling" the container of the bottle body with the cleaning agent, it is necessary to remove the push dispenser by disconnecting it from the bottle body, "fill" the container with the cleaning agent, and then attach the push dispenser to the bottle body. The push dispenser is fixed to the bottle body due to the adhesion of the threading on the outer surface of the neck of the bottle body to the threading on the inner surface of the base of the push dispenser.

In the present application materials, the disclosure of the preferred embodiment of the claimed technical solution is presented, which is not meant to be limiting. Other particular embodiments that do not go beyond the scope of legal protection defined by the claims will be apparent to those skilled in the relevant art.

I claim:

1. An electric toothbrush comprising of
a bottle body containing a cleaning agent,
a neck with a bristle attachment,
a push dispenser for feeding the cleaning agent,
wherein a piston at a bottom of the bottle body that prevents the cleaning agent from flowing/spilling out of the bottle body through an air hole at the bottom of the bottle body, when the bottle body and the neck with the bristle attachment are connected by a fixing device and move in the longitudinal plane relative to each other,
wherein the neck comprises an insert-type electric actuator tightly fixed therein, a compartment for at least one battery, an insulating cover of the compartment, and a button for activating the toothbrush,
wherein the bristle attachment performs a vibration movement, and
wherein a spout of the head of the push dispenser does not come into contact with the bristle attachment when the toothbrush is in a folded position, while a push button of the dispenser is in the form of a cylinder with a base circle radius of 70 mm to 1 cm and a height of 1 cm to 1.5 cm.

2. The electric toothbrush according to claim 1, wherein the bristle attachment is made replaceable.

3. The electric toothbrush according to claim 1, wherein said toothbrush has a protective cap.

4. The electric toothbrush according to claim 3, wherein the protective cap consists of a cap and a pocket for the bristle attachment.

5. The electric toothbrush according to claim 1, wherein the bottle body and the neck are made of plastic.

6. The electric toothbrush according to claim 1, wherein the brush is fixed when expanded 180 degrees from the folded position, and wherein the neck of the toothbrush and the bottle body are fixed in the same plane by lock-on connection.

7. The electric toothbrush according to claim 1, wherein the cleaning agent is made in the form of a friable substance.

8. The electric toothbrush according to claim 1, wherein the cleaning agent is made in the form of a viscous substance.

9. The electric toothbrush according to claim 1, wherein the cleaning agent is made in the liquid state.

10. The electric toothbrush according to claim 1, wherein the cleaning agent is made in the form of a foam.

11. The electric toothbrush according to claim 1, wherein the bottle body and the neck housing are made of a biodegradable polymer.

* * * * *